United States Patent
Forefält

(10) Patent No.: US 10,632,362 B2
(45) Date of Patent: Apr. 28, 2020

(54) PRE-VISUALIZATION DEVICE

(71) Applicant: Previble AB, Stockholm (SE)

(72) Inventor: Jonathan Forefält, Solna (SE)

(73) Assignee: PREVIBLE AB, Stockholm (SE)

( * ) Notice: Subject to any disclaimer, the term of this patent is extended or adjusted under 35 U.S.C. 154(b) by 95 days.

(21) Appl. No.: 15/799,593

(22) Filed: Oct. 31, 2017

(65) Prior Publication Data

US 2018/0117450 A1    May 3, 2018

(30) Foreign Application Priority Data

Nov. 1, 2016  (EP) ..................... 16196753

(51) Int. Cl.
| | | |
|---|---|---|
| A63C 19/06 | (2006.01) |
| G06T 13/40 | (2011.01) |
| G11B 27/031 | (2006.01) |
| G06T 1/00 | (2006.01) |
| G06T 7/20 | (2017.01) |
| G06T 13/80 | (2011.01) |

(52) U.S. Cl.
CPC ............ *A63C 19/06* (2013.01); *G06T 1/0007* (2013.01); *G06T 7/20* (2013.01); *G06T 13/40* (2013.01); *G06T 13/80* (2013.01); *G11B 27/031* (2013.01)

(58) Field of Classification Search
CPC ........... A63C 19/06; G06T 13/40; G06T 7/20; G06T 1/0007; G06T 13/80; G11B 27/031
USPC ........................................................ 382/103
See application file for complete search history.

(56) References Cited

U.S. PATENT DOCUMENTS

| | | | | |
|---|---|---|---|---|
| 2010/0045869 A1* | 2/2010 | Baseley | ................. | G06T 19/00 348/598 |
| 2010/0201069 A1* | 8/2010 | Lam | ..................... | A63F 3/00643 273/237 |
| 2011/0244958 A1* | 10/2011 | Nimura | ............... | A63F 13/5252 463/31 |
| 2014/0357358 A1* | 12/2014 | Shikata | ................... | A63F 13/00 463/31 |
| 2015/0123966 A1* | 5/2015 | Newman | ............... | G06T 19/006 345/419 |
| 2016/0253844 A1* | 9/2016 | Petrovskaya | ........... | G06F 3/011 345/633 |
| 2016/0260251 A1* | 9/2016 | Stafford | ................ | G06T 19/006 |
| 2016/0262608 A1* | 9/2016 | Krueger | ............... | A61B 3/0041 |
| 2017/0043269 A1* | 2/2017 | Baker | ...................... | A63H 3/48 |
| 2018/0011317 A1* | 1/2018 | Hasegawa | ................ | A61B 6/02 |
| 2019/0060745 A1* | 2/2019 | He | ......................... | A63F 13/2145 |
| 2019/0065027 A1* | 2/2019 | Hauenstein | ......... | G06F 3/04815 |

* cited by examiner

*Primary Examiner* — Jerome Grant, II
(74) *Attorney, Agent, or Firm* — Adsero IP

(57) ABSTRACT

A pre-visualization device (10) for movie, game, and other digital media creation, the pre-visualization device (10, comprising:
one or more markers (13);
a motion capture camera system (14);
wherein
the one or more marker(s) (13) is/are adapted to be physically located and moveable on a marker plane (12), wherein each marker (13) comprises means (13a) adapted to provide position data in relation to its position (P) on the plane (12), the position and possibly movement is captured using the motion capture camera system (14).

14 Claims, 2 Drawing Sheets

PRE-VISUALIZATION DEVICE

TECHNICAL FIELD

Disclosed herein is a pre-visualization device that provides for movie, game, and other digital media creation.

BACKGROUND

Pre-visualizations such as digital pre-visualizations are employed in movie and TV-productions to create a common visual goal in the pre-production phase. In the traditional pre-visualization process one or more animators create the vision of a customer by means of a soft-ware provided for animation, however providing the customer limited possibilities to participate and control the creation in reality. Within the process, often a large extent of the information is lost, and a pre-visualization typically has to be iterated in an iteration phase many times before the customer is satisfied. Typically, the iteration phase is expensive and time consuming rendering an obvious limitation.

SUMMARY

According to an aspect, the expensive and time consuming iteration phase can even be considered to be a major problem in the pre-visualization process. An aspect of the present disclosure is to solve this problem, in particular in the iteration phase.

According to one aspect, this is provided by means of a pre-visualization device for users collaboratively controlling digital pre-visualization of movies, games and other digital media by means of moving physical markers on a marker plane.

Other aspects of the present disclosure involving directing, capturing, and editing a movie, game, and other digital media are disclosed herein.

One embodiment includes a pre-visualization device that provides for movie, game, and other digital media creation.

According to one embodiment, the device comprises one or more marker(s), a marker plane and a motion capture camera system. The one or more marker(s) is/are adapted to be physically located and moveable on a marker plane. Each marker comprises means adapted to provide position data in relation to its position on the plane. The position and possibly movement is captured using the motion capture camera system The pre-visualization device may be referred to as a "tool", that provides for movie, game, and other digital media creation.

The motion capture camera system is adapted to capture position data from the reflection means and transmit the position data comprising position information to determine position of the markers on the marker plane.

The position and possibly movement of a marker is captured alternatively to, or in addition to using the motion capture camera system, using other input and/or output means such as buttons, micro-chip(s) and/or micro-sensors adapted to register and transmit data, typically additional data, also referred to as "sensor data", to the pre-visualization device. These means are provided on on the markers and are arranged to communicate sensor data directly to the pre-visualization device.

According to one embodiment, the marker plane is a display table having a display. The display can be one of: Light emitting diode, LED, OLED, Liquid Crystal Display LCD or Plasma-type.

Alternatively, according to one embodiment, the display is a projector illuminating the display from a frontal-side or alternatively, according to one embodiment from a rear-side thereof.

Typically, each marker is divided into different components or parts, namely a base plate, a body with arms protruding from the body and reflection means mounted on the arms.

According to one embodiment, the motion capture camera system comprises a plurality of cameras mounted in the marker plane.

According to one embodiment, the motion capture camera system comprises a plurality of cameras mounted attached to a frame adapted to be placed around and physically separate from the marker plane.

Typically, an input unit can be adapted to control settings of the display table.

According to one embodiment, the pre-visualization device further comprises a computing environment adapted to be coupled to the camera system, the marker plane and possibly to the markers, wherein the computing environment is a central processing unit (CPU), that comprises one or more processors, and computer storage media, which computer storage media have instructions stored thereon which, when executed on the one or more processors, cause the one or more processors to capture position data and possibly motion of a marker on the marker plane using the motion capture camera system, wherein a scene is generated by the processor(s) based on the captured position data and possibly motion of the one or more markers.

One embodiment includes the following. Position information of one or more marker(s) on a marker plane environment is collected using a camera system, and a scene of the environment is generated based on the information. A virtual scene set is generated based on the information. A movie version of the scene set is generated and provided to one or more electronic device(s).

This Summary is provided to introduce a selection of concepts in a simplified form that are further described below in the Detailed Description. This Summary is not intended to be used as an aid in determining the scope of the claimed subject matter. Furthermore, the claimed subject matter is not limited to implementations that solve any or all disadvantages noted in any part of this disclosure.

DETAILED DESCRIPTION

Disclosed herein are pre-visualization devices that provide for movie, game, and other digital media creation. Scenes of a movie, or even a movie, can be directed, captured, and edited by means of the pre-visualization devices.

Figure 1:
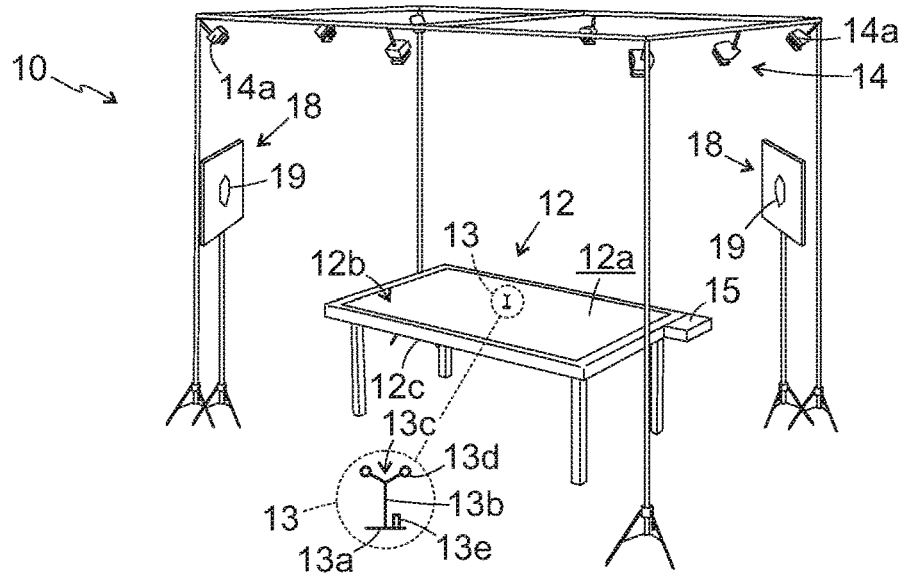
FIG. 1 illustrates one example embodiment of a pre-visualization device that provides for movie, game, and other digital media creation.

FIG. 1 illustrates one embodiment of a pre-visualization device 10 that provides for movie, game, and other digital media creation. Basically, the pre-visualization device 10 at least comprises a marker plane 12, one or more markers 13, and a motion capture camera system 14.

According to various embodiments, for instance as illustrated schematically in FIG. 1, the marker plane 12 is embodied as a display table 12 having a display 12a. As an example, as illustrated in FIG. 1, the display table 12 can be embodied as a "conventional" table as regards size, i. e. of similar size, say 1.5*2 meters, but in contrast to a "conventional" table also having a built-in display 12a, for instance in a center part of the table 12 having a framing part and legs as illustrated in FIG. 1. The display 12a can be one of: Light emitting diode, LED, OLED, Liquid Crystal Display LCD or Plasma-type display. Alternatively, the display 12a can be embodied as a projector illuminating the display 12a from a frontal-side 12b thereof. The display 12a can alternatively be a projector illuminating the display 12a from a rear-side 12c thereof. Thus, herein the term "display" is intended to be interpreted in a broad sense.

As a non-limiting example, the markers 13 can be from 5 to 20 cm in height. Typically, as illustrated in an enlargement of the inset in FIG. 1, the markers 13 are divided into different components or parts, namely a base plate 13a, a body 13b with arms 13c protruding from the body 13b and reflection means 13d mounted on the arms 13c. The baseplate 13a of the marker 13 that is adapted to be located onto the display table 12, on the display 12a, which may have some type of co-ordinate system.

The reflection means 13d can be embodied in different designs, for instance as reflection spheres. Herein, the term "reflection" means that light from the one or more cameras 14a will be reflected back to the cameras 14a to provide position data of the markers 13 on the display 15 table 12 to the cameras 14a. It is possible that some other means than light is reflected such as radio waves or the like.

The base plate 13a, as well as the body 13b, can be made of metal and/or composite material such as plastics. Each and every body 13b is uniquely embodied such that the pre-visualization device 10 and/or users is/are able to distinguish between them and hence distinguish between different markers 13. A "unique body" means that the body 13b itself and/or only the arms 13c differs between different markers. One or more markers may be embodied to represent similar or same features, for instance a movie camera. The representation of a movie camera will be further described below.

The base plate 13a is provided in different designs. As examples: a basic design consist of a solid base plate, a more advanced design comprises input and/or output means 13e such as buttons, micro-chip(s) and/or micro-sensors adapted to register and transmit data, typically additional data, also referred to as "sensor data", to the pre-visualization device 10 such as indicating button(s) pressed, or position data. The term "additional" means additional to the position data captured and transmitted by means of the camera system 14.

The camera system 14 includes one or more motion capture cameras 14a for determining positioning information of the markers 13 on the display table 12. The motion capture camera system 14 is used to collect and/or capture data upon which a scene, a set of scenes and further on a movie will be based. The motion capture cameras 14a can be mounted in a number of arrangements, for instance attached to a frame adapted to be placed around and physically separate from the marker plane 12. The motion capture cameras 14a, say 4 cameras 14a are mounted in a respective corner of the frame, thereby creating two sets of cameras 14a. Between the two sets of cameras 14a, a respective further camera 14a is mounted within each set, all together providing 6 cameras. This is illustrated in FIG. 1. The number of the one or more of cameras 14a is by no means limited to this particular number of cameras as illustrated in FIG. 1, but can be higher or lower.

The camera system 14 including the cameras 14a is/are adapted to capture position data, sometimes also referred to as and comprising "position information", from the reflection means 13d and transmits the position data comprising position information to determine position of the markers 13 on the marker plane 12. In this FIG. 1, position is where the inset of the marker 13 is located on the marker plane 12. The cameras 14a are adapted also to handle motion of the markers 13, even if this is not explicitly illustrated.

According to the embodiment illustrated in FIG. 1, an input unit 15 is connected to the pre-visualization device 10, herein directly to the marker plane 12 as protruding from the marker table 12. The input unit 15 is adapted to control settings of the marker plane 12. Alternatively, but not illustrated in any FIGS., the input unit 15 can be mounted in the marker plane if provided as a display table 12 and typically embodied as a touch-screen, or be part of the display 12a if embodied as a touch-screen.

Figure 3:
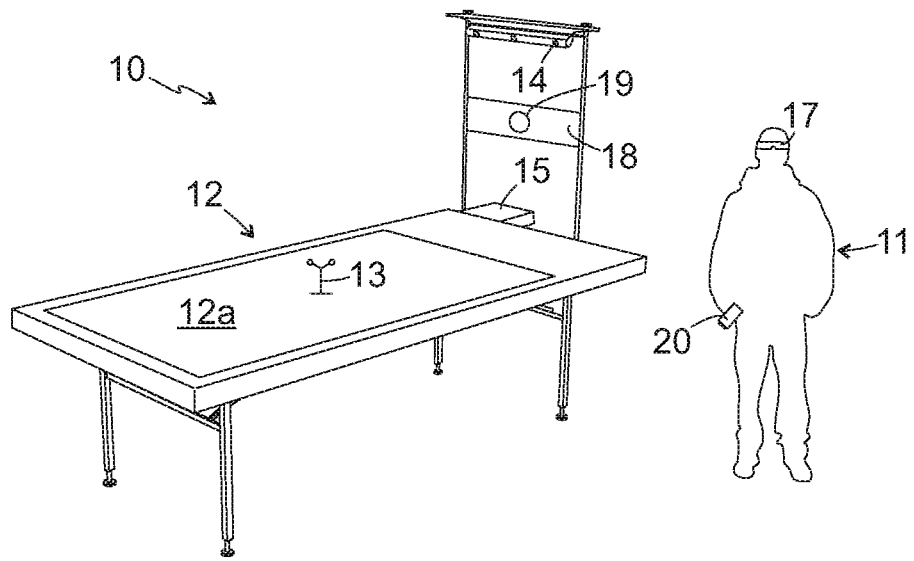
FIG. 3 illustrates one example embodiment of a pre-visualization device that provides for movie, game, and other digital media creation.

A user, not illustrated in this FIG. 1, but in FIG. 3 only, without any intention to be delimiting the user to the embodiment illustrated in FIG. 3 only, is provided with direct visual information, such as direct visual feed-back directly from the marker plane, or by one or more external display(s) 18, typically surrounding the marker plane 12.

Figure 2:
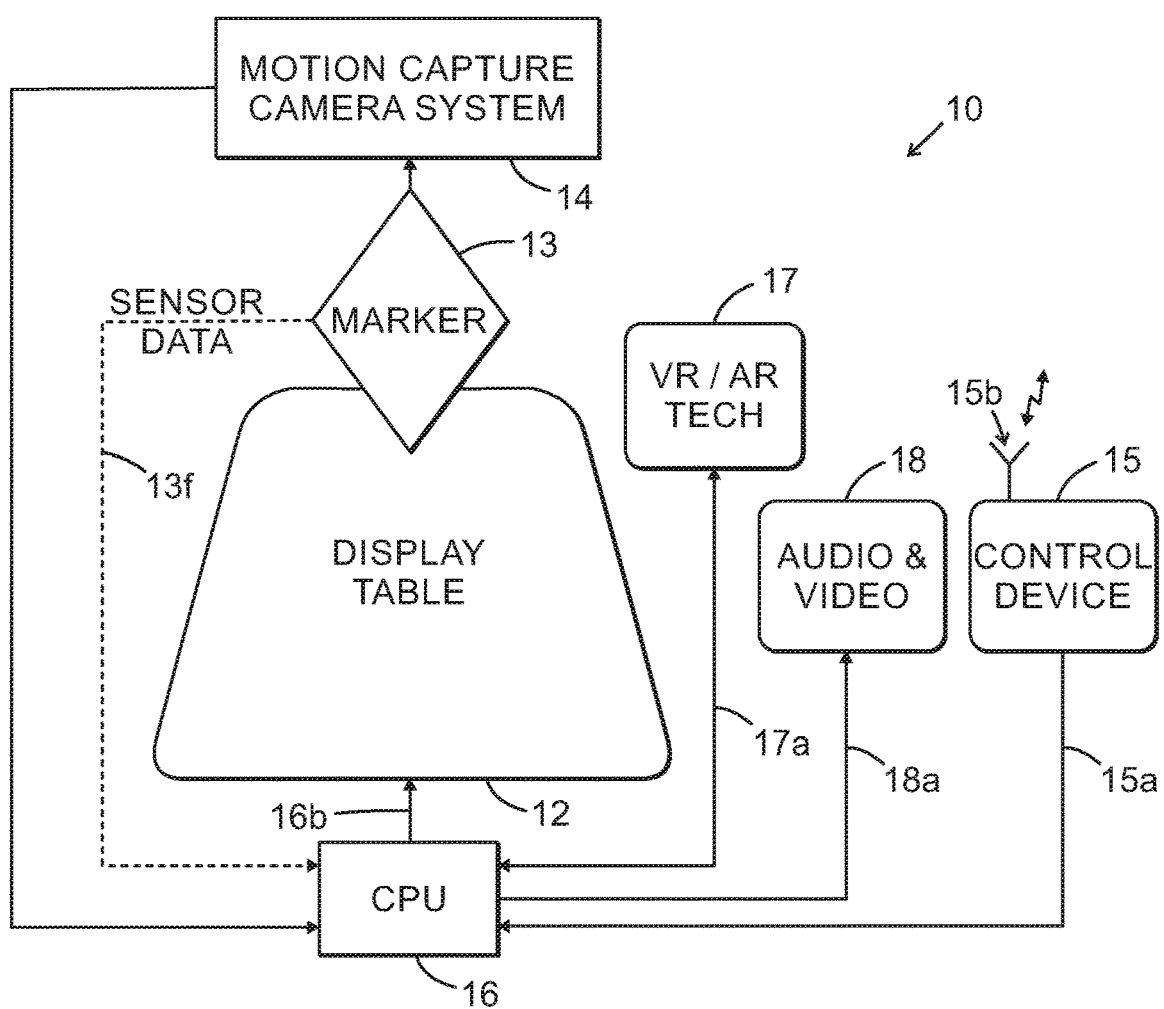
FIG. 2 illustrates, in a schematic representation, one example embodiment of a pre-visualization device that provides for movie, game, and other digital media creation.

Now is referred to FIG. 2. FIG. 2 illustrates, in a schematic representation, one example embodiment of a pre-visualization device 10 that provides for movie, game, and other digital media creation. See also FIG. 3, which illustrates one embodiment of a pre-visualization device 10 that, like the embodiment illustrated and described with reference to FIG. 1, provides for movie, game, and other digital media creation.

FIG. 2 illustrates one embodiment of a pre-visualization device 10 that, like the embodiment illustrated and described with reference to FIG. 1 or 3, provides for movie, game, and other digital media creation. Basically, the pre-visualization device 10 at least comprises a display table 12, one or more markers 13, and a motion capture camera system 14 as illustrated and described above.

A user 11 such as a movie director can move the markers 13 around the marker plane 12, in FIG. 2 specifically referred to as a "display table" 12, to create and modify a virtual set in which a scene will be shot. The director 11 (see FIG. 3) can modify this virtual set by, for example, "grabbing" and possibly moving a marker 13 on the display table 12 to a new position. The pre-visualization device 10 is also able to capture motions of the markers 13 using the camera system 14 and to generate a movie based on the virtual set of one or more scenes.

Note that the term "scene" may refer to actions that take place over some period of time. For example, a "scene" in a movie may refer to actions that take place over a period of time. A scene 19 in a movie may have multiple frames of data that are presented sequentially.

The pre-visualization device 10 can be controlled by one particular user 11 (as illustrated in FIG. 3), but could also be adapted to fit groups of users involving more than one single user to be able to work collaboratively with a scene and together in collaboration in real-time see the pre-visualization by means of the pre-visualization device 10.

The pre-visualization device 10 may be referred to as a "tool", that provides for movie, game, and other digital media creation. This tool provides a solution to the problem described above in section "BACKGROUND" in relation to the iteration phase. By means of the pre-visualization device 10, a user, such as a director, is provided with a tool that is intuitative and versatile, a pre-visualization tool providing the user to be able to self-control the work with the pre-visualization.

Typically, and according to the embodiment illustrated and described in relation to FIG. 2, the pre-visualization device 10 further includes a computing unit 16 coupled via a camera system link 14b or directly via a computing unit link 16a to the display table 12. However, according to alternative embodiments, not illustrated in FIG. 1, the computing unit 16 can be distributed. The computing unit 16 per se will be disclosed below with reference to FIG. 4.

The pre-visualization device 10 is able to capture the marker's 13 movements using the motion capture camera system 14 to transmit information to the computing unit 16 and to generate a movie based thereon by means of the computing unit 16. Thus, the movie can be generated based on information received from the motion capture cameras 14a via the camera system link 14b. Note that additional data such as sensor data from one or more marker(s) 13 via a sensor data link 13f could also optionally (as illustrated by a dashed line in FIG. 2) be used to generate the movie. An audio/visual device 18 depicts a scene 19 (see FIG. 1) based, at least in part, on information captured by the motion capture camera system 14.

According to one non-limiting aspect, it may be stated that the pre-visualization device 10 allows for the creation of a "virtual movie set" by allowing various real-world objects to be used as different kinds of props. Thus, at least some of the elements in the scene 19 may be computer generated graphics. However, as noted the scene 19 could be based on video data also. For example, actual video data from a marker 13 embodied as a camera might be used to represent the camera of a camera man in the scene 19. Other objects may also be represented in the scene 19 by video data.

Embodiments of the pre-visualization device 10 may be connected to an audio/visual device 18 having a display. The audio/visual device 18 may for example be a television, a monitor, a high-definition television (HDTV), or the like that may provide game or application visuals and/or audio to a user. For example, the computing environment 16 may include a video adapter such as a graphics card and/or an audio adapter such as a sound card that may provide audio/visual signals associated with the game or other application. The audio/visual device 18 may receive the audio/visual signals from the computing environment 16 and may then output the game or application visuals and/or audio associated with the audio/visual signals to the user 11. According to one embodiment, the audio/visual device 18 may be connected to the computing environment 16 via a signal link 18a, for example, an S-Video cable, a coaxial cable, an HDMI cable, a DVI cable, a VGA cable, a component video cable, or the like.

As shown in FIG. 2, the camera system 14 may include one or more motion capture camera(s) 14a. According to an example embodiment, the motion capture camera 14a may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera system 14.

As shown in FIG. 2, according to an example embodiment, the motion capture camera 14a may include an IR light component, a three-dimensional (3-D) camera, and an RGB camera that may be used to capture the depth image of a scene. For example, in time-of-flight analysis, the IR light component of the capture camera 14a may emit an infrared light onto the scene and may then use sensors to detect the reflected light from the reflectors 13d of the markers 13.

In some embodiments, pulsed infrared light may be used such that the time between an outgoing light pulse and a corresponding incoming light pulse may be measured and used to determine a physical distance from one motion capture camera 14a to a particular marker 13 in the scene. Additionally, in other example embodiments, the phase of the outgoing light wave may be compared to the phase of the incoming light wave to determine a phase shift. The phase shift may then be used to determine a physical distance from the motion capture camera 14a to a particular marker 13.

According to another embodiment, the capture camera system 14 may include two or more physically separated cameras 14a, 14a that may view a scene from different angles, to obtain visual stereo data that may be resolved to generate depth information. In another example embodiment, the motion capture camera system 14 may use cloud data.

The motion capture camera system 14 may further include one or more microphones. The microphone(s) may include a transducer or sensor that may receive and convert sound into an electrical signal. According to one embodiment, the microphone may be used to reduce feedback between the camera system 14 and the computing environment 16 in the target recognition, analysis, and tracking. Additionally, the microphone may be used to receive audio signals that may also be provided by the user to control applications such as game applications, non-game applications, or the like that may be executed by the computing environment 16.

As shown in FIG. 2, the capture camera system 14 may be in communication with the computing environment 16 via a communication link 16a. The communication link 16a may be a wired connection including, for example, a USB connection, a Firewire connection, an Ethernet cable connection, or the like and/or a wireless connection such as a wireless 802.11b, g, a, or n connection. According to one embodiment, the computing environment 16 may provide a clock to the camera system 14 that may be used to determine when to capture, for example, a scene via the communication link 16a.

Now is referred to FIG. 3.

A user(s) 11 can position a marker 13 that serves as a "virtual camera" in a vantage point from which a scene is to be captured. The device 10 can detect the location of the virtual camera and determine how to generate the scene from that vantage point. Note that the virtual camera 13 need not be used to record the scene. Rather, marker position data from the camera system 14 can be used as the subject matter for the movie. Note that there may be multiple markers acting as virtual cameras, such that the user might view and capture a scene from multiple perspectives. The device 10 may also be used to edit the movie. As one example, the camera might be used to allow the user to enter commands to edit the movie.

The device 10 may also or alternatively transmit a signal to an external screen of a user's 11 own electronic device, such as VR and AR glasses 17. By means of using an external hardware, for instance a user input device 15 such as a mouse, key-board, VR or AR glasses, or a touch-screen, the user can easily control soft-ware settings in a user interface. Also, the user 11 can view how the scene 19 will appear from the director's perspective. Note that the user 11 may view the scene in real-time. Note that the user 11 can move around the room to test out how different camera perspectives will appear by moving the marker representing the movie camera. Likewise, the device 10 can perform similar functions for the camera person's VR and AR glasses 17.

The VR and AR glasses 17 could alternatively be any electronic device 20, such as a cellular telephone, a notepad computer, etc. Typically, the electronic device 14 has some type of display screen for viewing the scene 19. Note that the electronic device 20 per se does not need to capture any video or the like, although that is one possibility. Rather, the data upon which the scene 19 is generated may be collected from the camera system 14.

Figure 4:
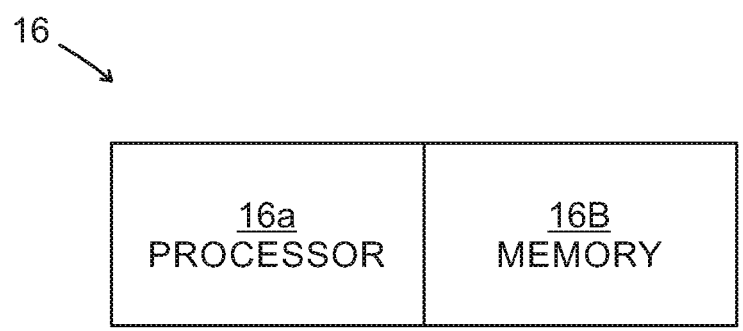
FIG. 4 illustrates one example embodiment of a computing environment that may be used in the pre-visualization device, as illustrated in any of FIGS. 1 and/or 2.

FIG. 4 illustrates an example embodiment of a computing environment that may be used for creating and editing movies, as well as other purposes. The computing environment may be used for computing environment 16 of FIG. 2.

Further details of one embodiment of the computing environment 16 will now be discussed with reference to FIG. 4. The computing environment 16 may include hardware components and/or software components such that computing environment 16 may be used to execute movie, gaming and non-gaming applications. In one embodiment, the computing environment 16, herein referred to as a "Central Processing Unit" (CPU) may include a processor 16a such as a standardized processor, a specialized processor, a microprocessor, or the like that may execute instructions stored on a processor readable storage device 16B, herein referred to as a "memory", for performing processes described herein.

The CPU typically comprise a graphics processing unit (GPU) and a video encoder/video codec (coder/decoder) that form a video processing pipeline for high speed and high resolution graphics processing. Data is carried from the GPU to the video encoder/video codec via a bus. The video processing pipeline outputs data to an AV (audio/video) port for transmission to a television or other display 18.

A wireless adapter 15 a may provide access to a network (e.g., the Internet, home network, etc.) and may be any of a wide variety of various wired or wireless adapter components including an Ethernet card, a modem, a Bluetooth module, a cable modem, and the like.

The scene 19 may be generated from computer generated graphics, video data, or a combination thereof. As noted above, a scene 19 may refer to actions that occur over some period of time and may include multiple frames of data that are presented sequentially.

The CPU 16 creates a movie based at least on the scene in response to user commands via the control device 15. Creation of the movie may involve allowing a user to direct, capture, and edit the movie. In some embodiments (as in FIG. 3), a version of the scene 19 is provided to the electronic device 20 being held by the director 11 or other user. The version may be from the perspective of the electronic device 20. Thus, the electronic device 20 may serve as a "virtual viewfinder."

Note that the scene 19 may be presented from the perspective of the director 11. Also, the director 11 may view the scene 19 in real-time. For example, the director 11 sees the scene 19 from the perspective of the electronic 14 device. In a sense, the electronic device 14 is being used as a virtual viewfinder to allow the director 11, camera person, etc. to determine a suitable camera angle.

The movie is edited using the device 10.

Editing allows the user to create a movie based on all of the captured scenes. As noted, in some embodiments, the user enters editing commands using voice commands and/or gestures, which are recognized by device 10.

Numerous techniques may be used to determine the position of the marker 13. Moreover, the position may be determined based on various types of data.

In one embodiment, the electronic device 20 runs an application that allows it to be used as a virtual pre-viewer of a scene 19. This application may be configured to communicate with the device 10 to send information to the electronic device 20.

The version of the scene 19 can be transmitted to the electronic device 20. Typically, this will be by wireless transmission, but wired transmission may be used. The transmission may use various mechanisms such as 802.11, Bluetooth, cellular telephone transmission, etc.

The version of the scene 19 can be displayed on the electronic device 20. The aforementioned application on the electronic device 20 may be used to communicate with the device 10 to receive the version of the scene 19 and to present the scene 19 on a display. As noted above, the version of the scene 19 may be a real-time version. As the term "real-time" is presently being used, there may be some small delay due to the time it takes the device 10 to generate the version of the scene 19, transmission delay, rendering delays, and other possible delays.

For example, the electronic device 20 may be running an application that allows it to communicate with the device 10 in response to commands from the user 11.

Note that many different sets of metadata may be stored.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

The invention claimed is:

1. A pre-visualization device for movie, game, and other digital media creation, the pre-visualization device, comprising:
   one or more physical markers;
   a motion tracking system;
   wherein the one or more physical marker(s) is/are adapted to be physically located and moveable on a marker plane, wherein each marker comprises means adapted to provide position data in relation to its position on the plane, and the position and possible movement is captured using the motion tracking system, wherein the one or more physical marker(s) comprises input and/or output means, wherein the input and/or output means further includes one or more of buttons, micro-chip(s) and micro-sensor adapted to register and transmit data, typically additional data, to the device such as button(s) pressed or position data.

2. The pre-visualization device of claim 1, wherein the marker plane is a display table having a display.

3. The pre-visualization device of claim 2, wherein the display is one of: Light emitting diode, LED, OLED, Liquid Crystal Display LCD or Plasma-type.

4. The pre-visualization device of claim 2, wherein the display is a projector illuminating the display from a frontal-side thereof.

5. The system of claim 2, wherein the display is a projector illuminating the display from a rear-side thereof.

6. The pre-visualization device of claim 1, wherein each marker is divided into different components or parts, namely a base plate, a body with arms protruding from the body and reflectors mounted on the arms.

7. The pre-visualization device of claim 6, wherein the base plate is a solid base plate.

8. The pre-visualization device of claim 6, wherein the base plate comprises the input and/or output means.

9. The pre-visualization device of claim 6, wherein the base plate as well as the body is made of one or more of: metal and/or composite material such as plastics.

10. The pre-visualization device of claim 1, wherein the motion tracking system is a motion capture camera system comprising a plurality of cameras mounted in the marker plane.

11. The pre-visualization device of claim 1, wherein the motion tracking system is a motion capture camera system comprising a plurality of cameras mounted attached to a frame adapted to be placed around and physically separate from the marker plane.

12. The pre-visualization device of claim 11, wherein the motion tracking system is adapted to capture position information, from the reflection means and transmit the position data comprising position information to determine position of the markers on the marker plane.

13. The pre-visualization device of claim 1, wherein an input unit is adapted to control settings of the marker plane.

14. The pre-visualization device of claim 1, comprising a computing environment adapted to be coupled to the motion tracking system, the marker plane and possibly to the markers, wherein the computing environment is a central processing unit (CPU), that comprises one or more processors, and computer storage media (CPU), which computer storage media have instructions stored thereon which, when executed on the one or more processors, cause the one or more processors to capture position data and possibly motion of a marker on the plane using the motion tracking system, wherein a scene is generated by the processor(s) based on the captured position data and possibly motion of the one or more markers.

* * * * *